US005693738A

United States Patent [19]
Okazaki et al.

[11] Patent Number: 5,693,738
[45] Date of Patent: Dec. 2, 1997

[54] COMPOSITION FOR URETHANE-BASE PLASTIC LENS, URETHANE-BASE PLASTIC LENS OBTAINED FROM THE COMPOSITION, AND PROCESS FOR THE PRODUCTION OF THE PLASTIC LENS

[75] Inventors: Koju Okazaki; Chitoshi Shimakawa; Mamoru Tanaka; Yoshinobu Kanemura; Teruyuki Nagata, all of Fukuoka-ken; Seiichi Kobayashi, Kanagawa-ken; Yoko Tajiri, Kanagawa-ken; Nobuya Kawauchi, Kanagawa-ken; Katsuyoshi Sasagawa, Kanagawa-ken, all of Japan

[73] Assignee: Mitsui Toatsu Chemicals, Inc., Tokyo, Japan

[21] Appl. No.: 413,113

[22] Filed: Mar. 29, 1995

[30] Foreign Application Priority Data

| Apr. 8, 1994 | [JP] | Japan | 6-070347 |
| Aug. 30, 1994 | [JP] | Japan | 6-204969 |
| Dec. 5, 1994 | [JP] | Japan | 6-300611 |
| Dec. 5, 1994 | [JP] | Japan | 6-300612 |

[51] Int. Cl.$^6$ .................................... C08G 18/18
[52] U.S. Cl. .................. 528/51; 528/53; 528/54; 528/58; 524/709; 524/710; 523/106; 264/1.1
[58] Field of Search .................. 528/51, 53, 54, 528/58; 524/709, 710; 523/106; 264/1.1

[56] References Cited

U.S. PATENT DOCUMENTS

| 3,661,885 | 5/1972 | Haddick et al. | 528/51 |
| 4,327,204 | 4/1982 | Oyaizu et al. | 528/61 |
| 4,975,328 | 12/1990 | Hirose et al. | 428/413 |
| 5,075,405 | 12/1991 | Atchekzai et al. | 528/52 |

FOREIGN PATENT DOCUMENTS

| 0359222 | 1/1991 | European Pat. Off. |
| 0469459 | 7/1992 | European Pat. Off. |
| 0562966 | 2/1994 | European Pat. Off. |

OTHER PUBLICATIONS

Database WPI, Week 9120, Derwent Publications Ltd., London, GB; AN 146193, XP002000869, "Thiocarbamic Acid Alkyl Ester Based Lens Preparation Cast" & JP-A-03084021 (Mitsui Toatsu) Sep. 4, 1991 *Abstract*.

*Primary Examiner*—Rachel Gorr
*Attorney, Agent, or Firm*—Burns, Doane, Swecker & Mathis

[57] ABSTRACT

A composition for a urethane-base plastic lens, comprising:
(a) at least one ester compound selected from the group consisting of isocyanate compounds, isothiocyanate compounds and isocyanato-containing isothiocyanate compounds,
(b) at least one active hydrogen compound selected from the group consisting of hydroxyl compounds, mercapto compounds and mercapto-containing hydroxyl compounds,
(c) a tertiary amine, and
(d) a Lewis acid;

a plastic lens obtained by heating and curing the composition, and a process for the production of the plastic lens. The composition has a long pot life and can produce an optically uniform plastic lens in a short time.

18 Claims, No Drawings

COMPOSITION FOR URETHANE-BASE PLASTIC LENS, URETHANE-BASE PLASTIC LENS OBTAINED FROM THE COMPOSITION, AND PROCESS FOR THE PRODUCTION OF THE PLASTIC LENS

BACKGROUND OF THE INVENTION

1. Field of the Invention

This invention relates to a composition for urethane-base plastic lenses useful as various optical lenses such as eyeglass lenses, a lens obtained from the composition, and also a process for the production of the lens.

2. Description of the Related Art

Plastic lenses are moldings which are required to have a high degree of optical homogeneity for their intended application. Although the mechanism for the occurrence of optical non-uniformity has not been fully elucidated, it is considered to occur during the molding of a plastic lens. Thermal non-uniformity appears to take place due to a localized progress of polymerization, resulting in convection of monomers. These monomers under the convection then seem to be solidified, that is, polymerized as they are, leading to optical non-uniformity.

Upon molding a plastic lens, casting polymerization is generally adopted, in which raw materials, namely, monomers are injected in a mold and then cured under heat. To obtain an optically uniform molding, the monomers are polymerized by gradually heating them from a low temperature to a high temperature, generally in the course of over ten hours or, to obtain a thick molding tending to develop optical non-uniformity, for several days so that occurrence of thermal non-uniformity inside the lens can be avoided.

On the other hand, it has also been attempted in various ways to obtain an optically uniform molding in a short time. A representative example of such attempts is polymerization making use of light or another radiation, whose application has been attempted on radical-polymerizable monomers. This is to conduct polymerization by using light or other radiation which features a high polymerization velocity, so that monomers can be cured prior to the occurrence of any thermal non-uniformity inside the resulting lens [Isao Kaetsu, "Kogaku Gijutsu Contact (Optical Technology Contact)", 7(7), 31 (1979)].

In the meantime, the present inventors proposed urethane-base plastic lenses as plastic lenses having a high refractive index. For example, they proposed, in Japanese Patent Laid-Open No. 199016/1985, a urethane-based plastic lens obtained by heating and curing a composition of a polyisocyanate-compound and a polythiol compound and, in Japanese Patent Laid-Open No. 217229/1985, a urethane-based plastic lens obtained by heating and curing a composition of a polyisocyanate compound and a polyol compound.

Despite the outstanding demand for a reduction in the polymerization time, it is impossible to adopt, for the molding of these urethane-base plastic lenses, the light- or radiation-dependent instantaneous polymerization unlike compositions of the radical-polymerizable type because urethanation is a reaction governed by heat.

Furthermore, upon molding plastic lenses, it generally takes at least 2 to 5 hours from the preparation of a monomer composition until its injection into molds. Use of a high-activity catalyst or of a catalyst in a large proportion to provide an increased polymerization velocity is however accompanied by the problem that the polymerization reaction is allowed to proceed during the preparation of the monomer composition, thereby making it impossible to inject the monomer composition into the molds, in other words, no sufficient pot life is available.

As a production process for these urethane-based plastic lenses, the present inventors also proposed in Japanese Patent Laid-Open No. 84021/1991 a process making use of a tertiary amine either singly or in combination with dibutyltin dilaurate. The tertiary amine employed in this process is required to contain an electron attractive group in its molecule. If a tertiary amine free of such an electron attractive group, for example, triethylamine is used, the activity of the amine is so high that the polymerization reaction proceeds uncontrollably quickly. This makes it impossible even to inject the monomers into a mold. Even with this process, there is the problem that, when polymerization is conducted under heat in a short time, the resulting lens tends to develop optical non-uniformity.

SUMMARY OF THE INVENTION

An object of the present invention is to provide a composition for a urethane-based plastic lens, which comprises at least one ester compound selected from the group consisting of isocyanate compounds, isothiocyanate compounds and isocyanato-containing isothiocyanate compounds and at least one active hydrogen compound selected from the group consisting of hydroxyl compounds, mercapto compounds and mercapto-containing hydroxyl compounds, and which can produce in a short time a lens having optical uniformity.

Another object of the present invention is to provide an optically uniform lens obtained using the composition.

A further object of the present invention is to provide a process for producing an optically uniform plastic lens from the composition in a short time.

To attain the above objects, the present inventors have proceeded with extensive research, resulting in the following findings and hence leading to the completion of the present invention.

1) Upon molding a urethane-based plastic lens from at least one ester compound selected from the group consisting of isocyanate compounds, isothiocyanate compounds and isocyanato-containing isothiocyanate compounds and at least one active hydrogen compound selected from the group consisting of hydroxyl compounds, mercapto compounds and mercapto-containing hydroxyl compounds, combined use of a Lewis acid and a tertiary amine as a catalyst can prevent any uncontrollably abrupt reaction and can furnish a sufficient pot life even when the tertiary amine is such a tertiary amine that has no electron attractive group and has heretofore been considered impossible to provide any sufficient pot life.

2) Depending on the combination of monomers, lower polymerizability can still be available around room temperature compared with the polymerizability available when the above-described catalyst is not used, thereby providing a longer pot life than that available without the catalyst described above.

3) Although details have not been ascertained, the catalyst making the combined use of the Lewis acid and the tertiary amine shows high catalytic activity by heating, thereby allowing the reaction to proceed quickly. The resulting lens therefore hardly develop optical non-uniformity even when the polymerization time is shortened significantly.

The present invention therefore provides a composition for a urethane-based plastic lens, comprising:

(a) at least one ester compound selected from the group consisting of isocyanate compounds, isothiocyanate compounds and isocyanato-containing isothiocyanate compounds, (b) at least one active hydrogen compound selected from the group consisting of hydroxyl compounds, mercapto compounds and mercapto-containing hydroxyl compounds, (c) a tertiary amine, and (d) a Lewis acid;

a plastic lens molded from the composition, and a process for the production of the plastic lens from the composition.

Due to these features of the present invention, it is now possible to mold an optically uniform urethane-based plastic lens in a short time, thereby bringing about a considerable advantage from the industrial standpoint.

DETAILED DESCRIPTION OF THE PREFERRED EMBODIMENTS

The present invention will hereinafter be described in detail.

Among ester compounds useful as raw materials for a urethane-base plastic lens in the present invention, each monoisocyanate can be selected from monoisocyanate compounds and monoisothiocyanate compounds.

Illustrative monoisocyanate compounds include phenyl isocyanate, butyl isocyanate and cyclohexyl isocyanate. Illustrative monoisothiocyanate compounds include phenyl isothiocyanate, butylisothiocyanate and cyclohexyl isothiocyanate.

Also usable are their halogen-substituted derivatives such as chlorine-substituted derivatives and bromine-substituted derivatives, alkyl-substituted derivatives, alkoxy-substituted derivatives, nitro-substituted derivatives, and the like.

Illustrative polyisocyanate compounds usable as raw materials for the urethane-based plastic lens in this invention include aliphatic polyisocyanates such as ethylene diisocyanate, trimethylene diisocyanate, tetramethylene diisocyanate, hexamethylene diisocyanate, octamethylene diisocyanate, nonamethylene diisocyanate, 2,2-dimethylpentane diisocyanate, 2,2,4-trimethylhexane diisocyanate, decamethylene diisocyanate, butene diisocyanate, 1,3-butadiene-1,4-diisocyanate, 2,4,4-trimethylhexamethylene diisocyanate, 1,6,11-undecane triisocyanate, 1,3,6-hexamethylene triisocyanate, 1,8-diisocyanato-4-isocyanato methyloctane, 2,5,7-trimethyl-1, 8-diisocyanato-5-isocyanato methyloctane, bis (isocyanatoethyl)carbonate, bis-(isocyanatoethyl) ether, 1,4-butylene glycol dipropyl ether-ω, ω'-diisocyanate, methyl lysinediisocyanate, lysine triisocyanate, 2-isocyanatoethyl-2,6-diisocyanatohexanoate, 2-isocyanatopropyl-2,6-diisocyanatohexanoate, xylylene diisocyanate, bis (isocyanatoethyl)benzene, bis(isocyanatopropyl)benzene, α,α,α',α'-tetramethylxylxylene diisocyanate, bis (isocyanatobutyl)benzene, bis(isocyanatomethyl)-naphthalene, bis(isocyanatomethyl)diphenyl ether, bis (isocyanatoethyl)phthalate, mesitylylene triisocyanate and 2,6-di(isocyanatomethyl)furan; alicyclic polyisocyanates such as isophorone diisocyanate, bis(isocyanatomethyl) cyclohexane, dicyclohexylmethane diisocyanate, cyclohexane diisocyanate, methylcyclohexane diisocyanate, dicyclo-hexyldimethylmethane diisocyanate, 2,2'-dimethyldicyclohexylmethane diisocyanate, bis(4-isocyanato-n-butylidene)pentaerythritol, dimeric acid diisocyanate, 2-isocyanatomethyl-3-(3-isocyanatopropyl)-5-isocyanatomethylbicyclo[2.2.1]-heptane, 2-isocyanatomethyl-3-(3-isocyanatopropyl)-6-isocyanatomethyl-bicyclo[2.2.1]-heptane, 2-isocyanatomethyl-2-(3-isocyanatopropyl)-5-isocyanatomethyl-bicyclo[2.2.1]-heptane, 2-isocyanatomethyl-2-(3-isocyanatopropyl)-6-isocyanatomethyl-bicyclo[2.2.1]-heptane, 2-isocyanatomethyl-3-(3-isocyanatopropyl)-6-(2-isocyanatoethyl-bicyclo[2.1.1]-heptane, 2-isocyanatomethyl-3-(3-isocyanatopropyl)-6-(2-isocyanatoethyl)-bicyclo[2.2.1]-heptane, 2-isocyanatomethyl-2-(3-isocyanatopropyl)-5-(2-isocyanatoethyl)-bicyclo[2.2.1]-heptane, 2-isocyanatomethyl-2-(3-isocyanatopropyl)-6-(2-isocyanatoethyl)-bicyclo[2.2.1]-heptane and 1,3,5-tris (isocyanatomethyl)cyclohexane; aromatic polyisocyanates such as phenylene diisocyanate, tolylene diisocyanate, ethylphenylene diisocyanate, isopropylenephenylene diisocyanate, dimethylphenylene diisocyanate, diethylphenylene diisocyanate, diisopropylphenylene diisocyanate, trimethylbenzene triisocyanate, benzene triisocyanate, naphthalene diisocyanate, methylnaphthalene diisocyanate, biphenyl diisocyanate, tolidine diisocyanate, 4,4'-diphenylmethane diisocyanate, 3,3'-dimethyldiphenylmethane-4,4'-diisocyanate, bibenzyl-4,4'-diisocyanate, bis(isocyanatophenyl)ethylene, 3,3'-dimethoxybiphenyl-4,4'-diisocyanate, triphenylmethane triisocyanate, polymeric MDI, naphthalene triisocyanate, diphenylmethane-2,4,4'-triisocyanate, 3-methyldiphenylmethane-4,6,4'-triisocyanate, 4-methyldiphenylmethane-3,5,2',4',6'-pentaisocyanate, phenylisocyanatomethylisocyanate, phenylisocyanatoethylisocyanate, tetrahydronaphthylene diisocyanate, hexahydrobenzene diisocyanate, hexahydrodiphenylmethane-4,4'-diisocyanate, diphenyl ether diisocyanate, ethylene glycol diphenyl ether diisocyanate, 1,3-propylene glycol diphenyl ether diisocyanate, benzophenone diisocyanate, diethylene glycol diphenyl ether diisocyanate, dibenzofuran diisocyanate, carbazole diisocyanate, ethylcarbazole diisocyanate and dichlorocarbazole diisocyanate; sulfur-containing aliphatic polyisocyanates such as thiodiethyl diisocyanate, thiodipropyl diisocyanate, thiodihexyl diisocyanate, dimethylsulfone diisocyanate, dithiodimethyl diisocyanate, dithiodiethyl diisocyanate, dithiodipropyl diisocyanate, dicyclohexylsulfide-4,4'-diisocyanate and 1-isocyanatomethylthia-2,3-bis(2-isocyanatoethylthia) propane; aromatic sulfide polyisocyanates such as diphenyl sulfide-2,4'-diisocyanate, diphenyl sulfide-4,4'-diisocyanate, 3,3'-dimethoxy-4,4'-diisocyanatodibenzyl thioether, bis(4-isocyanatomethylbenzene)sulfide and 4,4'-methoxybenzenethioethyleneglycol-3,3'-diisocyanate; aromatic disulfide polyisocyanates such as diphenyldisulfide-4,4,'-diisocyanate, 2,2'-dimethyldiphenyldisulfide-5,5,'-diisocyanate, 3,3'-dimethyldiphenyldisulfide-5,5,'-diisocyanate, 3,3'-dimethyldiphenyldisulfide-6,6,'-diisocyanate, 4,4'-dimethyldiphenyldisulfide-5,5,'-diisocyanate, 3,3'-dimethoxydiphenyldisulfide-4,4,'-diisocyanate and 4,4'-dimethoxydiphenyldisulfide-3,3,'-diisocyanate; aromatic sulfone polyisocyanates such as diphenylsulfone-4,4'-diisocyanate, diphenylsulfone-3,3'-diisocyanate, benzidinesulfone-4,4,'-diisocyanate, diphenylmethane sulfone-4,4,'-diisocyanate, 4-methyldiphenylmethanesulfone-2,4'-diisocyanate, 4,4'-dimethoxydiphenyslsulfone-3,3'-diisocyanate, 3,3'-dimethoxy-4,4'-diisocyanatodibenzylsulfone, 4,4'- dimethyldiphenylsulfone-3,3'-diisocyanate, 4,4'-di-tert-butyldiphenylsulfone-3,3'-diisocyanate, 4,4'-methoxybenzeneethylenedisulfone-3,3'-diisocyanate and 4,4'-dichlorodiphenylsulfone-3,3'-diisocyanate; sulfonic acid ester polyisocyanates such as 4-methyl-3-isocyanatobenzenesulfonyl-4'-isocyanatophenol ester and 4-methoxy-3-isocyanatobenzenesulfonyl-4'-isocyanatophenol ester; aromatic sulfonamides such as 4-methyl-3-isocyanatobenzenesulfonylanilido-3'-methyl-4'-isocyanate, dibenzenesulfonyl-ethylenediamine-4,4'-diisocyanate, 4,4'-methoxybenzenesulfonyl-ethylenediamine-3,3'-diisocyanate and 4-methyl-3-isocyanatobenzenesulfonylanilido-4-methyl-3'-isocyanate; sulfur-containing heterocyclic compounds such as thiophene-2,5-diisocyanate, methyl thiophene-2,5-diisocyanate, 1,4-dithiane-2,5-diisocyanate, methyl 1,4-dithiane-2,5-diisocyanate, 1,3-dithiolane-4,5-diisocyanate, methyl-1,3-dithiolane-4,5-diisocyanate, methyl 1,3-dithiolane-2-methyl-4,5-diisocyanate, ethyl 1,3-dithiolane-2,2-diisocyanate, tetrahydrothiophene-2,5-diisocyanate, methyl tetrahydrothiophene-2,5-diisocyanate, ethyl tetrahydrothiophene-2,5-diisocyanate and methyl tetrahydrothiophene-3,4-diisocyanate.

Also usable are their halogen-substituted derivatives such as chlorine-substituted derivatives and bromine-substituted derivatives, alkyl-substituted derivatives, alkoxy-substituted derivatives, nitro-substituted derivatives, prepolymer-type derivatives modified with polyhydric alcohols, carbodiimide-modified derivatives, urea-modified derivatives, biuret-modified derivatives, dimerized reaction products, trimerized reaction products, and the like.

The polyisothiocyanate compound employed as a raw material in this invention is a compound containing two or more -NCS groups in a molecule and, optionally, one or more sulfur atoms in addition to the isothiocyanate groups.

Specific examples include aliphatic polyisothiocyanates such as 1,2-diisothiocyanatoethane, 1,3-diisothiocyanatopropane, 1,4-diisothiocyanatobutane, 1,6-diisothiocyanatohexane and p-phenylenediisopropylidene diisothiocyanate; alicyclic polyisothiocyanates such as cyclohexane diisothiocyanate; aromatic polyisothiocyanates such as 1,2-diisothiocyanatobenzene, 1,3-diisothiocyanatobenzene, 1,4-diisothiocyanatobenzene, 2,4-diisothiocyanatotoluene, 2,5-diisothiocyanato-m-xylene, 4,4'-diisothiocyanato-1,1'-biphenyl, 1,1'-methylenebis(4-isothiocyanatobenzene), 1,1'-methylenebis(4-isothiocyanato-2-methylbenzene), 1,1'-methylenebis(4-isothiocyanato-3-methylbenzene), 1,1'-(1,2-ethanediyl)bis(4-isothiocyanatobenzene), 4,4'-diisothiocyanatobenzophenone, 4,4'-diisothiocyanato-3,3'-dimethylbenzophenone, benzanilido-3,4'-diisothiocyanate, diphenyl ether-4,4'-diisothiocyanate and diphenylamine-4,4'-diisothiocyanate; heterocyclic-ring-containing isothiocyanates such as 2,4,6-triisothiocyanato-1,3,5-triazine; carbonyl isothiocyanates such as hexanedioyl diisothiocyanate, nonanedioyl diisothiocyanate, carbonic diisothiocyanate, 1,3-benzenedicarbonyl diisothiocyanate, 1,4-benzenedicarbonyl diisothiocyanate and (2,2'-bipyridine)-4,4'-dicarbonyl diisothiocyanate.

Illustrative bifunctional or higher polyisothiocyanates, which contain one or more sulfur atoms in addition to at least one isothiocyanato group and are usable in the present invention, include sulfur-containing aliphatic isothiocyanates such as thiobis(3-isothiocyanatopropane), thiobis(2-isothiocyanatoethane) and dithiobis(2-isothiocyanatoethane); sulfur-containing aromatic isothiocyanates such as 1-isothiocyanato-4-[(2-isothiocyanato)sulfonyl]benzene, thiobis(4-isothiocyanatobenzene), sulfonylbis(4-isothiocyanatobenzene), dithiobis(4-isothiocyanatobenzene), 4-isothiocyanato-1-[(4-isothiocyanatophenyl)sulfonyl]-2-methoxybenzene, phenyl 4-methyl-3-isothiocyanatobenzenesulfonyl-4'-isothiocyanate, and 4-methyl-3-isothiocyanatobenzenesulfonylanilido-3'-methyl-4'-isothiocyanate; and sulfur-containing heterocyclic compounds such as thiophenone-2,5-diisothiocyanate and 1,4-dithiane-2,5-diisothiocyanate.

Also usable are their halogen-substituted derivatives such as chlorine-substituted derivatives and bromine-substituted derivatives, alkyl-substituted derivatives, alkoxy-substituted derivatives, nitro-substituted derivatives, prepolymer-type derivatives modified with polyhydric alcohols, carbodiimide-modified derivatives, urea-modified derivatives, biuret-modified derivatives, dimerized reaction products, trimerized reaction products, and the like.

Exemplary isothiocyanate compounds, which contain an isocyanato group and are usable as raw materials in this invention, include aliphatic or alicyclic compounds such as 1-isocyanato-3-isothiocyanatopropane, 1-isocyanato-5-isothiocyanatopentane, 1-isocyanato-6-isothiocyanatohexane, isocyanatocarbonyl isothiocyanate and 1-isocyanato-4-isothiocyanatocyclohexane; aromatic compounds such as 1-isocyanato-4-isothiocyanatobenzene and 4-methyl-3-isocyanato-1-isothiocyanatobenzene; heterocyclic compounds such as 2-isocyanato-4,5-diisothiocyanato-1,3,5-triazine; and compounds containing one or more sulfur atoms in addition to an isothiocyanato group, such as 4-isocyanato-4'-isothiocyanato-diphenyl sulfide and 2-isocyanato-2'-isothiocyanatodiethyl disulfide.

Also usable are their halogen-substituted derivatives such as chlorine-substituted derivatives and bromine-substituted derivatives, alkyl-substituted derivatives, alkoxy-substituted derivatives, nitro-substituted derivatives, prepolymer-type derivatives modified with polyhydric alcohols, carbodiimide-modified derivatives, urea-modified derivatives, biuret-modified derivatives, dimerized reaction products, trimerized reaction products, and the like.

These ester compounds can be used either singly or in combination.

The active hydrogen compound employed for the urethane-based plastic lens according to the present invention is selected from hydroxyl compounds, mercapto compounds and mercapto-containing hydroxyl compounds.

Illustrative hydroxyl compounds include mono-alcohols such as methanol, benzyl alcohol, phenol, ethoxyethanol; aliphatic polyols such as ethylene glycol, diethylene glycol, propylene glycol, dipropyleneglycol, butylene glycol, neopentyl glycol, glycerin, trimethylolethane, trimethylolpropane, butanetriol, 1,2-methylglycoside, pentaerythritol, dipentaerythritol, tripentaerythritol, sorbitol, erythritol, threitol, ribitol, arabinitol, xylitol, allitol, mannitol, durcitol, iditol, glycol, inositol, hexanetriol, triglycerose, diglyperol, triethylene glycol, polyethylene glycol, tris(2-hydroxyethyl)cyanurate, cyclobutanediol, cyclopentanediol, cyclohexanediol, cycloheptanediol, cyclooctanediol, cyclohexanedimethanol, hydroxypropylcyclohexanol, tricyclo[5.2.1.0.2.6]decanedimethanol, bicyclo[4.3.0]nonanediol, dicyclohexanediol, tricyclo[5.3.1.1]dodecanediol, bicyclo[4.3.0]nonanedimethanol, tricyclo[5.3.1.1]dodecane-diethanol, hydroxypropyltricyclo[5.3.1.1]dodecanol, spiro[3.4] octanediol, butylcyclohexanediol, 1,1'- bicyclohexylidenediol, cyclohexanetriol, maltitol and lactitol; aromatic polyols such as dihydroxynaphthalene, trihydroxynaphthalene, tetrahydroxynaphthalene, dihydroxybenzene, benzenetriol, biphenyltetraol, pyrogalla, (hydroxynaphthyl)pyrogallol, trihydroxyphenanthrene, bisphenol A, bisphenol F, xylylene glycol, di(2-hydroxyethoxy)benzene, bisphenol A-bis(2-hydroxyethyl ether), tetrabromobisphenol A, tetrabromobisphenol A-bis (2-hydroxyethyl ether); halogenated polyols such as dibromoneopentyl glycol; high molecular polyols such as epoxy resins; condensation reaction products between organic acids such as oxalic acid, glutamic acid, adipic acid, acetic acid, propionic acid, cyclohexanecarboxylic acid, β-oxocyclohexanepropionic acid, dimer acid, phthalic acid, isophthalic acid, salicylic acid, 3-bromopropionic acid, 2-bromoglycol dicarboxycyclohexane, pyromellitic acid, butanetetracarboxylic acid and bromophthalic acid and the above-described polyols; addition reaction products between the above-described polyols and alkylene oxides such as ethylene oxide and propylene oxide; addition reaction products between alkylene polyamines and alkylene oxides such as ethylene oxide and propylene oxide; and sulfur-containing polyols such as bis[4-(hydroxyethoxy) phenyl]sulfide, bis[4-(2-hydroxypropoxy)phenyl]sulfide, bis[4-(2,3-dihydroxypropoxy)phenyl]sulfide, bis[4-(4-hydroxycyclohexyloxy)phenyl]sulfide, bis[2-methy-4-(hydroxyethoxy)-6-butylphenyl]sulfide, compounds obtained by adding ethylene oxide and/or propylene oxide at a rate of 3 molecules on average per hydroxyl group to these sulfides, di-(2-hydroxyethyl)sulfide, 1,2-bis(2-hydroxyethylmercapto)ethane, bis(2-hydroxyethyl) disulfide, 1,4-dithiane-2,5-diol, bis(2,3-dihydroxypropyl) sulfide, tetrakis(4-hydroxy-2-thiabutyl)methane, bis(4-hydroxyphenyl)sulfone ("Bisphenol S", trade name), tetrabromobisphenol S, tetramethylbisphenol S, 4,4'-thiobis(6-tert-butyl-3-methylphenol) and 1,3-bis(2-hydroxyethylthioethyl)cyclohexane.

Illustrative mercapto compounds include monothiols such as methyl mercaptan, benzenethiol, benzylthiol; aliphatic polythiols such as methanedithiol; 1,2-ethanedithiol, 1,1-propanedithiol, 1,2-propanedithiol, 1,3-propanedithiol, 2,2-propanedithiol, 1,6-hexanedithiol, 1,2,3-propanetrithiol, tetrakis(mercaptomethyl)methane, 1,1-cyclohexanedithiol, 1,2-cyclohexandithiol, 2,2-dimethylpropane-1,3-dithiol, 3,4-dimethoxybutane-1,2-dithiol, 2-methylcyclohexane-2, 3-dithiol, bicyclo[2.2.1]hepta-exo-cis-2,3-dithiol, 1,1-bis (mercaptomethyl)cyclohexane, bis(2-mercaptoethyl) thiomalate, 2-mercaptoethyl-2,3-dimercaptosuccinate, 2,3-dimercapto-1-propanol-2-mercaptoacetate, 2,3-dimercapto-1-propanol-3-mercaptoacetate, diethylene glycol bis(2-mercaptoacetate), diethylene glycol bis(3-mercaptopropionate), 1,2-dimercaptopropyl methyl ether, 2,3-dimercaptopropyl methyl ether, 2,2-bis (mercaptomethyl)-1,3-propanedithiol, bis(2-mercaptoethyl) ether, ethylene glycol bis(2-mercaptoacetate), ethylene glycol bis(3-mercaptopropionate), trimethylolpropane tris(2-mercaptoacetate), trimethylolpropane tris(3-mercaptopropionate), pentaerythritol tetrakis(2-mercaptoacetate), pentaerythritol tetrakis(3-mercaptopropionate) and 1,2-bis(2-mercaptoethylthio)-3-mercaptopropane; aromatic polyols such as 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl) benzene, 1,2-bis(mercaptoethyl)benzene, 1,3-bis (mercaptoethyl)benzene, 1,4-bis(mercaptoethyl)benzene, 1,2-bis(mercaptomethyleneoxy)benzene, 1,3-bis (mercaptomethyleneoxy)benzene, 1,4-bis (mercaptomethyleneoxy)benzene 1,2-bis (mercaptoethyleneoxy)benzene, 1,3-bis (mercaptoethyleneoxy)benzene, 1,4-bis (mercaptoethyleneoxy)benzene, 1,2,3-trimercaptobenzene, 1,2,4-trimercaptobenzene, 1,3,5-trimercaptobenzene, 1,2,3-tris(mercaptomethyl)benzene, 1,2,4-tris(mercaptomethyl) benzene, 1,3,5-tris(mercaptomethyl)benzene, 1,2,3-tris (mercaptoethyl)benzene, 1,2,4-tris(mercaptoethyl)benzene, 1,3,5-tris(mercaptoethyl)benzene, 1,2,3-tris (mercaptomethyleneoxy)benzene, 1,2,4-tris (mercaptomethyleneoxy)benzene, 1,3,5-tris (mercaptomethyleneoxy)benzene, 1,2,3-tris (mercaptoethyleneoxy)benzene, 1,2,4-tris (mercaptoethyleneoxy)benzene, 1,3,5-tris(mercaptoethyleneoxy)benzene, 1,2,3,4-tetramercaptobenzene, 1,2,3, 5-tetramercaptobenzene, 1,2,4,5-tetramercaptobenzene, 1,2, 3,4-tetrakis(mercaptomethyl)benzene, 1,2,3,5-tetrakis (mercaptomethyl)benzene, 1,2,4,5-tetrakis (mercaptomethyl)benzene, 1,2,3,4-tetra-bis(mercaptoethyl) benzene, 1,2,3,5-tetrakis(mercaptoethyl)benzene, 1,2,4,5-tetrakis(mercaptoethyl)benzene, 1,2,3,4-tetrakis (mercaptoethyl)benzene, 1,2,3,5-tetrakis (mercaptomethyleneoxy)benzene, 1,2,4,5-tetrakis (mercaptomethyleneoxy)benzene, 1,2,3,4-tetrakis (mercaptoethyleneoxy)benzene, 1,2,3,5-tetrakis (mercaptoethyleneoxy)benzene, 1,2,4,5-tetrakis (mercaptoethyleneoxy)benzene, 2,2'-dimercaptobiphenyl, 4,4'-dimercaptobiphenyl, 4,4'-dimercaptobibenzyl, 2,5-toluenedithiol, 3,4-toluenedithiol, 1,4-naphthalenedithiol, 1,5-naphthalenedithiol, 2,6-naphthalenedithiol, 2,7-naphthalenedithiol, 2,4-dimethylbenzene-1,3-dithiol, 4,5-dimethylbenzene-1,3-dithiol, 9,10-anthracenedimethanethiol, 1,3-di(p-methoxyphenyl) propane-2,2-dithiol, 1,3-diphenylpropane-2,2-dithiol, phenylmethane-1,1-dithiol and 2,4-di(p-mercaptophenyl)-pentane; halogen-substituted aromatic polythiols, e.g., chlorine-substituted aromatic polythiols and bromine-substituted aromatic polythiols such as 2,5-dichlorobenzene-1,3-dithiol, 1,3-di(p-chlorophenyl) propane-2,2-dithiol, 3,4,5-tribromo-1,2-dimercaptobenzene and 2,3,4,6-tetrachloro-1,5-bis(mercaptomethyl)benzene; polythiols containing one or more heterocyclic rings, such as 2-methylamino-4,6-dithiol-sym-triazine, 2-ethylamino-4,6-dithiol-sym-triazine, 2-amino-4,6-dithiol-sym-triazine, 2-morpholino-4,6-dithiol-symtriazine, 2-cyclohexylamino-4,6-dithiol-sym-triazine, 2-methoxy-4,6-dithiol-sym-triazine, 2-phenoxy-4,6-dithiol-sym-triazine, 2-thiobenzeneoxy-4,6-dithiol-sym-triazine and 2-thiobutyloxy-4,6-dithiol-sym-triazine; aromatic polythiols containing one or more sulfur atoms other than a mercapto group, such as 1,2-bis(mercaptomethylthio)benzene, 1,3-bis (mercaptomethylthio)benzene, 1,4-bis(mercaptomethylthio) benzene, 1,2-bis(mercaptoethylthio)benzene, 1,3-bis (mercaptoethylthio)benzene, 1,4-bis(mercaptoethylthio) benzene, 1,2,3-tris(mercaptomethylthio)benzene, 1,2,4-tris (mercaptomethylthio)benzene, 1,3,5-tris (mercaptomethylthio)benzene, 1,2,3-tris(mercaptoethylthio) benzene, 1,2,4-tris(mercaptoethylthio)benzene, 1,3,5-tris (mercaptoethylthio)benzene, 1,2,3,4-tetrakis (mercaptomethylthio)benzene, 1,2,3,5-tetrakis (mercaptomethylthio)benzene, 1,2,4,5-tetrakis (mercaptomethylthio)benzene, 1,2,3,4-tetrakis (mercaptoethylthio)benzene, 1,2,3,5-tetrakis (mercaptoethylthio)benzene and 1,2,4,5-tetrakis (mercaptoethylthio)benzene, and nucleus-alkylated derivatives of these aromatic polythiols; aliphatic polythiols containing one or more sulfur atoms other than a mercapto group, such as bis(mercaptomethyl)sulfide, bis (mercaptoethyl) sulfide, bis(mercaptopropyl)sulfide, bis (mercaptomethylthio)methane, bis(2-mercaptoethylthio) methane, bis(3-mercaptopropylthio)methane, 1,2-bis (mercaptomethylthio)ethane, 1,2-bis(2-mercaptoethylthio) ethane, 1,2-bis(3-mercaptopropylthio)ethane, 1,3-bis (mercaptomethylthio)propane, 1,3-bis(2-mercaptoethylthio)propane, 1,3-bis(3-mercaptopropylthio)propane, 1,2-bis(2-mercaptoethylthio)-3-mercaptopropane, 2-mercaptoethylthio-1,3-propanedithiol, 1,2,3-tris (mercaptomethylthio)propane, 1,2,3-tris(2-mercaptoethylthio)propane, 1,2,3-tris(3-mercaptopropylthio)propane, tetrakis (mercaptomethylthiomethyl)metane, tetrakis(2-mercaptoethylthiomethyl)methane, tetrakis(3-mercaptopropylthiomethyl)methane, bis(2,3-dimercaptopropyl)sulfide, 2,5-dimercapto-1,4-dithiane, bis (mercaptomethyl)disulfide, bis(mercpcatoethyl)disulfide and bis(mercaptopropyl)disulfide, as well as thioglycolic acid and mercaptopropionic acid esters of these polythiols, for example, hydroxymethyl sulfide bis(2-mercaptoacetate), hydroxymethyl sulfide bis(3-mercaptopropionate), hydroxyethyl sulfide bis(2-mercaptoacetate), hydroxyethyl sulfide bis(3-mercapto-propionate), hydroxypropyl sulfide bis(2-mercaptoacetate), hydroxypropylsulfide bis(3-mercaptopropionate), hydroxymethyl disulfide bis(2-mercaptoacetate), hydroxymethyl disulfide bis(3-mercaptopropionate), hydroxyethyl disulfide bis(2-mercaptoacetate), hydroxyethyl disulfide bis(3-mercaptopropionate), hydroxypropyl disulfide bis(2-mercaptoacetate), hydroxypropyl disulfide bis(3-mercaptopropionate), 2-mercaptoethyl ether bis(2-mercaptoacetate), 2-mercpatoethyl ether bis(3-mercaptopropionate), 1,4-dithiane-2,5-diol bis(2-mercaptoacetate), 1,4-dithiane-2,5-diol bis(3-mercaptopropionate), bis(2-mercaptoethyl)thioglycolate, bis (2-mercaptoethyl)thiodipropionate, bis(2-mercaptoethyl) 4,4-thiodibutyrate, bis(2-mercaptoethyl)dithioglycolate, bis (2-mercaptoethyl)dithiodipropionate, bis(2-mercaptoethyl) 4,4-dithiodibutyrate, bis(2,3-dimercaptopropyl) thiodiglycolate, bis(2,3-dimercaptopropyl) thiodipropionate, bis(2,3-dimercaptopropyl) dithioglycolate and (2,3-dimercaptopropyl)dithiodipropionate; and heterocyclic compounds containing one or more sulfur atoms other than a mercapto group, such as 3,4-thiophenedithiol, tetrahydrothiophene-2,5-dimercaptomethyl, 2,5-dimercapto-1,3,4-thiadiazole, 2,5-dimercapto-1,4-dithiane and 2,5-dimercaptomethyl-1,4-dithiane.

Illustrative mercapto-containing hydroxyl compounds include 2-mercaptoethanol, 3-mercapto-1,2-propanediol, glycerin di(mercaptoacetate), 1-hydroxy-4-mercaptocyclohexane, 2,4-dimercaptophenol, 2-mercaptohydroquinone, 4-mercaptophenol, 1,3-dimercapto-2-propanol, 2,3-dimercapto-1-propanol, 1,2-dimercapto-1,3-butanediol, pentaerythritol tris(3-mercaptopropionate), pentaerythritol mono(3-mercaptopropionate), pentaerythritol bis(3-mercaptopropionate), pentaerythritol tris(thioglycolate), pentaerythritol pentakis(3-mercaptopropionate), hydroxymethyl-tris(mercaptoethylthiomethyl)methane, 1-hydroxyethylthio-3- mercaptoethylthiobenzene, 4-hydroxy-4'-mercaptodiphenylsulfone, 2-mercaptoethylthio)ethanol, dihydroxyethyl sulfide mono (3-mercaptopropionate), dimercaptoethane mono(salicylate) and hydroxyethylthiomethyl-tris(mercaptoethylthio) methane.

Further, these active hydrogen compounds may also be used in the forms of their halogen-substituted derivatives such as chlorine-substituted derivatives and bromine-substituted derivatives. They can be used either singly or in combination.

Illustrative tertiary amines usable in the present invention include compounds to be set out below.

Illustrative aliphatic tertiary amines include triethylamine, tripropylamine, dipropylethylamine, tributylamine, trihexylamine, dimethylcylohexylamine, dicyclohexylmethylamine, tricyclohexylamine, diethylcyclohexylamine, dicyclohexylethylamine, dipropylcyclohexylamine, dicyclohexylpropylamine, dibutylcyclohexylamine, dicyclohexylbutylamine, N,N-dimethylbenzylamine, N,N-diethylbenzylamine, N,N-dipropylbenzylamine, N,N-dibutylbenzylamine, N-methylbenzylamine, 2-dimethylaminomethylphenol, 2,4,6-tris(N,N-dimethylaminomethyl)phenol, triethylenediamine, tetramethylethylenediamine, tetraethylethylenediamine, tetrapropylethylenediamine, tetrabutylethylenediamine, pentamethyldiethylenetriamine, pentaethyldiethylenetriamine, pentapropyldiethylenetriamine, pentabutyldiethylenetriamine, N-methylpiperidine, N-ethylpiperidine, N-propylpiperidine, N-butylpiperidine, N,N-dimethylpiperazine, N,N-diethylpiperazine, N,N-dipropylpiperazine, N,N-dibutylpiperazine, hexamethylenetetramine, dimethylaminoethyl acetate, diethylaminoethyl acetate, dimethylaminopropionitrile, diethylaminopropionitrile, N-methylmorpholine, N-ethylmorpholine, N-propylmorpholine, N-butylmorpholine, N-cyclohexylmorpholine, N-methylpiperidone, N-ethylpiperidone, N-propylpiperidone, N-butylpiperidone, N-methylpyrrolidine, N-ethylpyrrolidine, N-propylpyrrolidine, N-butylpyrrolidine, N-methylpyrrolidone, N-ethylpyrrolidone, N-propylpyrrolidone and N-butylpyrrolidone.

Illustrative aromatic tertiary amines include N,N-dimethylaniline, N,N-diethylaniline, N,N-dipropylaniline, N,N-dibutylaniline, N,N-cyclohexylmethylaniline, N,N-dicyclohexylaniline, diphenylmethylamine, diphenylethylamine, triphenylamine, N,N-dimethyltoluidine, N,N-diethyltoluidine, N-cyclohexyl-N-methyltoluidine, N,N-dicyclohexyltoluidine, N,N-dimethylnaphthylamine, N,N-diethynaphthylamine, N,N-dimethylanisidine N,N-diethylanisidine and N,N,N'N'-tetramethylphenylenediamine.

Other illustrative tertiary amines include pyridine, picoline, dimethylpyridine, 2,2'-bipyridyl, 4,4'-bipyridyl, pyradine, N-methylpyrazole, N-ethylpyrazole, N-propylpyrazole, N-butylpyrazole, N-cyclohexylpyrazole, pyridazine, pyrimidine, pyrinoline, oxazole, thiazole, 1-methylimidazole, 1-benzylimidazole, 1-methyl-2-methylimidazole, 1-benzyl-2-methylimidazole, 1-ethyl-4-methylimidazole, 1-ethyl-2-ethyl-4-methylimidazole, N-methylpyrrole, N-ethylpyrrole, N-butylpyrrole, N-methylpyrroline, N-ethylpyrroline, N-butylpyrroline, pyrimidine, purine, quinoline, isoquinoline, N-methylcarbazole, N-ethylcarbazole and N-butylcarbazole.

Lewis acids usable in the present invention are those capable of forming strong complexes or salts with the above-mentioned tertiary amines. Dibutyltin dilaurate, dibutyltin diacetate and stannous octoate are not preferred. Such Lewis acids include the following compounds:

Zinc compounds such as zinc chloride, zinc acetylacetone and zinc dibutyldithiocarbamate; iron compounds such as iron chloride and iron acetylacetone; aluminum compounds such as alumina, aluminum fluoride, aluminum chloride and triphenylaluminum; tin compounds such as tetrafluorotin, tetrachlorotin, tetrabromotin, tetraiodotin, methyltin trichloride, butyltin trichloride, dimethyltin dichloride, dibutyltin dichloride, trimethyltin chloride, tributyltin chloride, triphenyltin chloride, dibutyltin sulfide and di(2-ethylhexyl) tin oxide; titanium compounds such as tetrachlorotitanium; antimony compounds such as trichloroantimony, pentachloroantimony and dichlorotriphenylantimony; uranium compounds such as nitrouranium; cadmium compounds such as nitrocadmium; cobalt compounds such as cobalt chloride and cobalt bromide; thorium compounds such as nitrothorium; mercury compounds such as diphenylmercury; nickel compounds such as nickelocene; calcium compounds such as nitrocalcium and calcium acetate; vanadium compounds such as trichlorovanadium; copper compounds such as copper chloride and copper iodide; manganese compounds such as manganese chloride; zirconium compounds such as zirconium chloride; arsenic compounds such as triphenylarsenic and trichloroarsenic; and boron compounds such as boron trifluoride.

Of these Lewis acids, metal halides or organometal halides are preferably used in general. More preferred are tin compounds, with organotin halides being particularly preferred. These preferred Lewis acids are however not always preferred because preferred Lewis acids vary depending on the tertiary amine and the monomer combination employed together.

It is important for the present invention to use such a tertiary amine and Lewis acid in combination as a catalyst. The combined use of both the tertiary amine and the Lewis acid has made it possible to impart a sufficient pot life even around room temperature and also to give a certain degree of freedom to the kind and amount of the tertiary amine to be employed.

These tertiary amine and Lewis acid can each be used generally in an amount of 5 ppm to 5%, preferably in an amount of 10 ppm to 2%. Their amounts however vary depending on the monomer combination, the tertiary amine-Lewis acid combination, the kinds and amounts of additives such as the internal mold releasing agent, the configurations of the molding, etc. and can be determined as needed.

The ester compound and the active hydrogen compound, which are both employed as raw materials in the present invention, can be used at an (NCO+NCS)/(OH+SH) molar ratio generally in a range of 0.5–3.0, preferably in a range of 0.5–1.5.

Depending on the application purpose as in conventional forming processes, it is also possible to add various materials such as internal mold releasing agents, chain extenders, crosslinking agents, light stabilizers, ultraviolet absorbers, antioxidants, oil-soluble dyes and fillers.

In general, the lens of this invention can be obtained by casting polymerization. Described specifically, one or more ester compounds and one or more active hydrogen compounds are mixed with a tertiary amine and a Lewis acid. After degasifying the resultant liquid mixture by a suitable method as needed, the liquid mixture is cast in a mold. While gradually raising the temperature of the liquid mixture from a low temperature to a high temperature, the above compounds are polymerized. Although the polymerization temperature and time vary depending on the kinds of the monomers, the lens shape and the additives such as a catalyst, the polymerization temperature and time are generally—20° C. to 200° C. and 0.5 to 10 hours, respectively.

Further, the polymerization can be conducted in the surrounding atmosphere, in an inert gas such as nitrogen, or in a liquid medium such as water. Especially when a molding has a greater thickness and tends to develop optical non-uniformity, good results can often be obtained if the polymerization is carried out in part or entirely in a medium having good thermal conductivity such as water.

In addition, the lens so polymerized can then be subjected to annealing as needed. Physical or chemical treatment, processing or working—such as surface polishing, antielectrostatic treatment, hard coating treatment, non-reflective coating treatment, dyeing treatment or photochromic treatment—can be applied, as needed, to each lens according to the present invention to impart anti-reflective properties, high hardness, anti-mist properties or fashionability or to improve abrasion resistance or chemical resistance.

The present invention will hereinafter be described more specifically by the following examples and comparative examples. Among the performance tests of the lens obtained in each example, its refractive index, Abbe's number, specific gravity and optical strain were determined by the following testing methods, respectively.

Refractive index and Abbe's number:
Measured at 20° C. by a Pulfrich refractometer.
Specific gravity:
Measured by the Archimedes' method.
Optical Strain:
Each lens was observed using a polarizing plate and a high pressure mercury vapor lamp. The following ranking standard was employed:
A: Substantially free of strain.
B: Slight strain.
C: Marked strain.

Further, the viscosity of each monomer composition before injection into a mold was measured at 20° C. by a Brookfield rotational viscometer.

EXAMPLE 1

Mixed into a homogeneous solution were 68.8 parts (0.262 mole) of dicyclohexylmethane-4,4'-diisocyanate (hereinafter abbreviated as "HMDi"), 10.4 parts (0.096 mole) of 1-thioglycerin, 20.8 parts (0.114 mole) of 3,6-dioxaoctane-1,8-dimercaptan, 0.8 wt. % of tributylamine (based on the total weight of the ester compounds and the active hydrogen compounds; this applies equally to all subsequent designations of "wt. %"), 0.4 wt. % of dibutyltin dichloride (hereinafter abbreviated as "DBC") and, as an internal mold releasing agent, 1.2 wt. % of "JP-506" (trade name; product of Johoku Kagaku K. K.; acidic butoxyethyl phosphate, monoester-diester mixture), followed by degasification at 20° C.

One hour later, the solution was injected into a mold for a concave lens having a central thickness of 1.5 mm. The mold was composed of two glass molds and a gasket. The viscosity of the solution immediately before the injection was 35 cps, namely, lower than 100 cps so that the injection was extremely easy. A similar test was also conducted separately at 20° C. As a result, its viscosity upon elapsed time of 5 hours was found to be 72 cps, namely, still lower than 100 cps and hence to be extremely low.

The mold was then gradually heated from 40° C. to 140° C., at which the solution was heated and cured for 5 hours.

After cooling, the resulting lens was taken out of the mold and was heated again at 120° C. for 1 hour. The lens so obtained was inspected using a polarizing plate and a high pressure mercury vapor lamp. Optical strain was not observed practically. This result is also shown in Table 1.

The lens so obtained was colorless and transparent, and had a refractive index of 1.548 and an Abbe number of 47 as optical properties and a specific gravity of 1.18 as a physical property.

EXAMPLE 2

A test similar to that in Example 1 was conducted by changing the Lewis acid to 0.3 wt. % of dimethyltin dichloride (hereinafter abbreviated as "DMC") and 0.5 wt. % of TBA.

The result was good as in Example 1, as also shown in Table 1. Similarly to Example 1, the lens so obtained was colorless and transparent and free of optical strain, and had a refractive index of 1.548 and an Abbe number of 47 as optical properties and a specific gravity of 1.18 as a physical property.

EXAMPLES 3–11 & COMPARATIVE EXAMPLES 1–3

To confirm advantageous effects of a catalyst making combined use of a tertiary amine and a Lewis acid, plastic lenses were produced in the same manner as in Example 1. The results are shown in Table 1. Those examples were repeated with the internal mold releasing agent changed to "Zelec UN" (trade name; product of E. I. Du Pont de Nemours & Co., Inc.; acidic alkyl phosphate), dibutyl phosphate and "JP-506", respectively. The results were similar, namely, good.

TABLE 1

| Example or Comp. Ex. | Tertiary amine (wt. %) | Lewis acid (wt. %) | Viscosity after 5 hrs (cps) | Optical strain |
| --- | --- | --- | --- | --- |
| Comp. Ex. 1 | — | — | 120 | C |
| Comp. Ex. 2 | TBA 0.8 | — | Resinified | C |
| Comp. Ex. 3 | — | DBC 0.4 | 250 | C |
| Example 1 | TBA 0.8 | DBC 0.4 | <100 | A |

TABLE 1-continued

| Example or Comp. Ex. | Tertiary amine (wt. %) | Lewis acid (wt. %) | Viscosity after 5 hrs (cps) | Optical strain |
| --- | --- | --- | --- | --- |
| Example 2 | TBA 0.5 | DMC 0.2 | <100 | A |
| Example 3 | Triethylamine 0.4 | DBC 0.4 | <100 | A |
| Example 4 | N,N-Dibuthylamino-ethanol 0.6 | DBC 0.4 | <100 | A |
| Example 5 | Dimethylcyclo-hexylamine 0.6 | DBC 0.4 | <100 | A |
| Example 6 | Dimethylaniline 0.5 | DBC 0.4 | <100 | A |
| Example 7 | 2,2'-Dipyridyl 0.4 | DBC 0.4 | <100 | A |
| Example 8 | N-Methylpyrrole 0.3 | DBC 0.4 | <100 | A |
| Example 9 | Triethylenediamine 0.2 | DBC 0.4 | <100 | A |
| Example 10 | Tris(2,4,6-dimethylamino methyl)phenol 0.2 | DBC 0.4 | <100 | A |
| Example 11 | Diethylcyclo-hexylamine 0.6 | DBC 0.4 | <100 | A |

EXAMPLE 12

A test similar to that in Example 1 was conducted using 43.5 parts (0.23 mole) of m-xylylene diisocyanate (hereinafter abbreviated as "XDi"), 56.5 parts (0.115 mole) of pentaerythritol tetrakis(3-mercaptopropionate) (hereinafter abbreviated as "PEMP"), 0.005 wt. % of N,N-diethylcyclohexylamine (hereinafter abbreviated as "DEC"), 0.01 wt. % of DBC and, as an internal mold releasing agent, 0.1 wt. % of "Zelec UN". The result is shown in Table 2.

The lens so obtained was colorless and transparent, and had a refractive index of 1.594 and an Abbe number of 36 as optical properties and a specific gravity of 1.34 as a physical property.

EXAMPLES 13–47 & COMPARATIVE EXAMPLES 4–5

To confirm advantageous effects of a catalyst making combined use of a tertiary amine and a Lewis acid, plastic lenses were produced in the same manner as in Example 12. The results are shown in Table 2. Those examples were repeated with the internal mold releasing agent changed to "Zelec UN", dibutyl phosphate and "JP-506", respectively. The results were similar, namely, good without any problem.

TABLE 2

| Example or Comp. Ex. | Tertiary amine (wt. %) | Lewis acid (wt. %) | Viscosity after 5 hrs (cps) | Optical strain |
| --- | --- | --- | --- | --- |
| Comp. Ex. 4 | DEC 0.005 | — | <100 | C |
| Comp. Ex. 5 | — | DBC 0.01 | 150 | C |
| Example 12 | DEC 0.005 | DBC 0.01 | <100 | A |
| Example 13 | DEC 0.003 | Alumina 0.003 | <100 | A |
| Example 14 | DEC 0.003 | Zinc chloride 0.005 | <100 | A |
| Example 15 | DEC 0.001 | Iron chloride 0.002 | <100 | A |
| Example 16 | DEC 0.05 | Tetrachlorotitanium 0.1 | <100 | B |
| Example 17 | DEC 0.005 | DMC 0.07 | <100 | A |
| Example 18 | TBA 0.005 | DMC 0.07 | <100 | A |
| Example 19 | TBA 0.005 | DBC 0.01 | <100 | A |
| Example 20 | Dimethylcyclo-hexylamine 0.005 | DBC 0.01 | <100 | A |
| Example 21 | Pyridine 0.02 | DBC 0.01 | <100 | A |
| Example 22 | 2,2'-Bipyridyl | DBC 0.01 | <100 | A |
| Example 23 | Dimethylaniline 0.01 | DBC 0.01 | <100 | A |
| Example 24 | N-Ethylcarbazole 0.005 | DBC 0.01 | <100 | A |
| Example 25 | Triethylamine 0.005 | DBC 0.01 | <100 | A |
| Example 26 | 1-Methylimidazole 0.005 | DBC 0.01 | <100 | A |

TABLE 2-continued

| Example or Comp. Ex. | Tertiary amine (wt. %) | Lewis acid (wt. %) | Viscosity after 5 hrs (cps) | Optical strain |
|---|---|---|---|---|
| Example 27 | N-Ethylpyrroline 0.005 | DBC 0.01 | <100 | A |
| Example 28 | N-Methylpyrroline 0.005 | DBC 0.01 | <100 | A |
| Example 29 | N-Methylpyrazole 0.005 | DBC 0.01 | <100 | A |
| Example 30 | Pyridazine 0.005 | DBC 0.01 | <100 | A |
| Example 31 | Pyrimidine 0.005 | DBC 0.01 | <100 | A |
| Example 32 | Pyrinoline 0.005 | DBC 0.01 | <100 | A |
| Example 33 | Oxazole 0.005 | DBC 0.01 | <100 | A |
| Example 34 | Thiazole 0.005 | DBC 0.01 | <100 | A |
| Example 35 | Purine 0.005 | DBC 0.01 | <100 | A |
| Example 36 | Quinoline 0.005 | DBC 0.01 | <100 | A |
| Example 37 | Isoquinoline 0.005 | DBC 0.01 | <100 | A |
| Example 38 | N,N-dimethylbenzyl-amine 0.008 | DBC 0.01 | <100 | A |
| Example 39 | N-Ethylpiperidine 0.005 | DBC 0.01 | <100 | A |
| Example 40 | N-methylpiperazine 0.005 | DBC 0.01 | <100 | A |
| Example 41 | Dimethylamino-ethylacetate 0.005 | DBC 0.01 | <100 | A |
| Example 42 | N-Methylmorpholine 0.005 | DBC 0.01 | <100 | A |
| Example 43 | N-Methylpiperidone 0.005 | DBC 0.01 | <100 | A |
| Example 44 | N-Methylpyrrolidine 0.005 | DBC 0.01 | <100 | A |
| Example 45 | Triethylenediamine 0.002 | DBC 0.01 | <100 | A |
| Example 46 | Pentamethyldiethylene-triamine 0.003 | DBC 0.01 | <100 | A |
| Example 47 | 2,4,6-Tris(dimethylamino-methylphenol) 0.002 | DBC 0.01 | <100 | A |

Example 48

A test similar to that in Example 1 was conducted using 52.0 parts (0.276 mole) of XDi, 48.0 parts (0.184 mole) of 1,2-bis(2-mercaptoethylthio)-3-mercaptopropane (hereinafter abbreviated as "GST"), 0.015 wt. % of DEC, 0.015 wt. % of DBC and 0.1 wt. % of "Zelec UN". As a result, the viscosity of the solution immediately before injection was lower than 100 cps so that the solution permitted extremely easy injection. The lens so obtained was colorless and transparent, and had a refractive index of 1.660, an Abbe number of 32 and a specific gravity of 1.35. Optical strain was not observed practically.

The example was also repeated with the internal mold releasing agent changed from "Zelec UN" to dibutyl phosphate, dioctyl phosphate and "JP-506", respectively. The results were similar, namely, good without any problem.

Comparative Example 6

A test similar to that in Example 1 was conducted using 52.0 parts (0.276 mole) of XDi, 48.0 parts (0.184 mole) of GST, 0.014 wt. % of dimethylaminoethyl acetate, 0.14 wt. % of dibutyltin dilaurate and 0.1 wt. % of "Zelec UN". This composition is equivalent to the composition of Example 2 in Japanese Patent Laid-Open No. 84021/1991. As a result, the viscosity of the solution immediately before injection was lower than 100 cps so that the solution permitted extremely easy injection. The lens so obtained was colorless and transparent, and had a refractive index of 1.660, an Abbe number of 32 and a specific gravity of 1.35. The lens however contained substantial optical strain.

Comparative Example 7

A test similar to that in Example 1 was conducted using 52.0 parts (0.276 mole) of XDi, 48.0 parts (0.184 mole) of GST, 0.069 wt. % of diethylaminoacrylonitrile and 0.1 wt. % of "Zelec UN". This composition is equivalent to the composition of Example 4 in Japanese Patent Laid-Open No. 84021/1991. As a result, the viscosity of the solution immediately before injection was lower than 100 cps so that the solution permitted extremely easy injection. The lens so obtained was colorless and transparent, and had a refractive index of 1.660, an Abbe number of 32 and a specific gravity of 1.35. The lens however contained substantial optical strain.

EXAMPLE 49

A test similar to that in Example 1 was conducted using 60.2 parts (0.229 mole) of HMDi, 39.8 parts (0.153 mole) of GST, 0.05 wt. % of dimethyltin dichloride (hereinafter abbreviated as "DMC"), 0.05 wt. % of dimethylcyclohexylamine (hereinafter abbreviated as "DCA") and 0.015 wt. % of "Zelec UN".

As a result, the viscosity of the solution immediately before injection was lower than 100 cps so that the solution permitted extremely easy injection. The lens so obtained was colorless and transparent, and had a refractive index of 1.594, an Abbe number of 42 and a specific gravity of 1.22. Optical strain was not observed practically.

The example was also repeated with the internal mold releasing agent changed from "Zelec UN" to dibutyl phosphate, dioctyl phosphate and "P-506", respectively. The results were similar, namely, good without any problem.

EXAMPLE 50

A test similar to that in Example 1 was conducted using 30.0 parts (0.114 mole) of HMDi, 30.0 parts (0.135 mole) of isophorone diisocyanate (hereinafter abbreviated as "IPDi"), 43.3 parts (0.166 mole) of GST, 0.05 wt. % of DMC, 0.05 wt. % of DCA and 0.015 wt. % of "Zelec UN".

As a result, the viscosity of the solution immediately before injection was lower than 100 cps so that the solution permitted extremely easy injection. The lens so obtained was colorless and transparent, and had a refractive index of 1.594, an Abbe number of 40 and a specific gravity of 1.23. Optical strain was not observed practically.

The example was also repeated with the internal mold releasing agent changed from "Zelec UN" to dibutyl phosphate, dioctyl phosphate and "JP-506", respectively. The results were similar, namely, good without any problem.

EXAMPLE 51

A test similar to that in Example 1 was conducted using 50.0 parts (0.225 mole) of IPDi, 10.0 parts (0.059 mole) of hexamethylene diisocyanate (hereinafter abbreviated as "HDi"), 49.4 parts (0.190 mole) of GST, 0.08 wt. % of DMC, 0.15 wt. % of DEC and 0.015 wt. % of "Zelec UN".

As a result, the viscosity of the solution immediately before injection was lower than 100 cps so that the solution permitted extremely easy injection. The lens so obtained was colorless and transparent, and had a refractive index of 1.596, an Abbe number of 40 and a specific gravity of 1.24. Optical strain was not observed practically.

The example was also repeated with the internal mold releasing agent changed from "Zelec UN" to dibutyl phosphate, dioctyl phosphate and "JP-506", respectively. The results were similar, namely, good without any problem.

EXAMPLE 52

A test similar to that in Example 1 was conducted using 63.0 parts (0.334 mole) of XDi, 15.0 parts (0.139 mole) of thioglycerin (hereinafter abbreviated as "TG"), 30.0 parts (0.061 mole) of PEMP, 0.01 wt. % of DBC, 0.005 wt. % of N,N-dibutylaminoethanol and 0.5 wt. % of dibutyl phosphate.

As a result, the viscosity of the solution immediately before injection was lower than 100 cps so that the solution permitted extremely easy injection. The lens so obtained was colorless and transparent, and had a refractive index of 1.598, an Abbe number of 35 and a specific gravity of 1.33. Optical strain was not observed practically.

The example was also repeated with the internal mold releasing agent changed from dibutyl phosphate to "Zelec UN", dioctyl phosphate and "JP-506", respectively. The results were similar, namely, good without any problem.

EXAMPLE 53

A test similar to that in Example 1 was conducted using 50.0 parts (0.225 mole) of IPDi, 59.8 parts (0.150 mole) of trimethylolpropane tris(3-mercaptopropionate), 0.10 wt. % of DMC, 0.05 wt. % of DEC and 0.015 wt. % of "Zelec UN".

As a result, the viscosity of the solution immediately before injection was lower than 100 cps so that the solution permitted extremely easy injection. The lens so obtained was colorless and transparent, and had a refractive index of 1.541, an Abbe number of 47 and a specific gravity of 1.21. Optical strain was not observed practically.

The example was also repeated with the internal mold releasing agent changed from "Zelec UN" to dibutyl phosphate, dioctyl phosphate and "JP-506", respectively. The results were similar, namely, good without any problem.

EXAMPLE 54

A test similar to that in Example 1 was conducted using 50.0 parts (0.225 mole) of IPDi, 55.0 parts (0.113 mole) of pentaerythritol tetrakis(3-mercaptopropionate), 0.10 wt. % of DMC, 0.05 wt. % of DEC and 0.015 wt. % of "Zelec UN".

As a result, the viscosity of the solution immediately before injection was lower than 100 cps so that the solution permitted extremely easy injection. The lens so obtained was colorless and transparent, and had a refractive index of 1.550, an Abbe number of 47 and a specific gravity of 1.22. Optical strain was not observed practically.

The example was also repeated with the internal mold releasing agent changed from "Zelec UN" to dibutyl phosphate, dioctyl phosphate and "JP-506", respectively. The results were similar, namely, good without any problem.

Comparative Example 8

A test similar to that in Example 1 was conducted using 50.0 parts (0.225 mole) of IPDi, 55.0 parts (0.113 mole) of pentaerythritol tetrakis(3-mercaptopropionate), 0.02 wt. % of dimethylaminoethyl acetate, 0.1 wt. % of dibutyltin dilaurate and 0.1 wt. % of "Zelec UN". This composition is equivalent to the composition of Example 1 in Japanese Patent Laid-Open No. 84021/1991.

As a result, the viscosity of the solution immediately before injection was lower than 100 cps so that the solution permitted extremely easy injection. The lens so obtained was colorless and transparent, and had a refractive index of 1.550, an Abbe number of 47 and a specific gravity of 1.22. The lens however contained substantial optical strain.

EXAMPLE 55

A test similar to that in Example 1 was conducted using 50.0 parts (0.191 mole) of HMDi, 50.6 parts (0.127 mole) of trimethylolpropane tris(3-mercaptopropionate), 0.10 wt. % of DMC, 0.05 wt. % of DEC and 0.015 wt. % of "Zelec UN".

As a result, the viscosity of the solution immediately before injection was lower than 100 cps so that the solution permitted extremely easy injection. The lens so obtained was colorless and transparent, and had a refractive index of 1.546, an Abbe number of 48 and a specific gravity of 1.21. Optical strain was not observed practically.

The example was also repeated with the internal mold releasing agent changed from "Zelec UN" to dibutyl phosphate, dioctyl phosphate and "JP-506", respectively. The results were similar, namely, good without any problem.

EXAMPLE 56

A test similar to that in Example 1 was conducted using 58.3 parts (0.300 mole) of 1,3-bis(isocyanatomethyl) cyclohexane (hereinafter abbreviated as "H6XDi"), 38.2 parts (0.180 mole) of 1,4-dithiane-2,5-bis(mercaptomethyl), 26.0 parts (0.06 mole) of pentaerythritol tetrakis (thioglycolate), 0.10 wt. % of TBA, 0.10 wt. % of DMC and 0.15 wt. % of "JP-506". As a result, the viscosity of the solution immediately before injection was lower than 100 cps so that the solution permitted extremely easy injection. The lens so obtained was colorless and transparent, and had a refractive index of 1.529, an Abbe number of 41 and a specific gravity of 1.30. Optical strain was not observed practically.

The example was also repeated with the internal mold releasing agent changed from "JP-506" to dibutyl phosphate, dioctyl phosphate and "Zelec UN", respectively. The results were similar, namely, good without any problem.

EXAMPLE 57

A test similar to that in Example 1 was conducted using 50.5 parts (0.260 mole) of H6XDi, 42.5 parts (0.200 mole) of 1,4-dithiane-2,5-bis(mercaptomethyl), 4.3 parts (0.040 mole) of TG, 0.10 wt. % of TBA, 0.10 wt. % of DBC and 0.70 wt. % of "JP-506". As a result, the viscosity of the solution immediately before injection was lower than 100 cps so that the solution permitted extremely easy injection. The lens so obtained was colorless and transparent, and had a refractive index of 1.590, an Abbe number of 42 and a specific gravity of 1.29. Optical strain was not observed practically.

The example was also repeated with the internal mold releasing agent changed from "JP-506" to dibutyl phosphate, dioctyl phosphate and "Zelec UN", respectively. The results were similar, namely, good without any problem.

EXAMPLE 58

A test similar to that in Example 1 was conducted using 47.1 parts (0.250 mole) of XDi, 21.2 parts (0.100 mole) of 1,4-dithiane-2,5-bis(mercaptomethyl), 26.1 parts (0.100 mole) of GST, 0.01 wt. % of TBA, 0.01 wt. % of DMC and 0.10 wt. % of "JP-506". As a result, the viscosity of the solution immediately before injection was lower than 100 cps so that the solution permitted extremely easy injection. The lens so obtained was colorless and transparent, and had a refractive index of 1.660, an Abbe number of 32 and a specific gravity of 1.35. Optical strain was not observed practically.

The example was also repeated with the internal mold releasing agent changed from "JP-506" to dibutyl phosphate, dioctyl phosphate and "Zelec UN", respectively. The results were similar, namely, good without any problem.

EXAMPLE 59

A test similar to that in Example 1 was conducted using 68.8 parts (0.262 mole) of HMDi, 8.8 parts (0.096 mole) of glycerin, 20.8 parts (0.114 mole) of 3,6-dioxaoctane-1,8-dimercaptan, 0.8 wt. % of TBA, 0.4 wt. % of DBC and 1.2 wt. % of "JP-506". As a result, the viscosity of the solution immediately before injection was lower than 100 cps so that the solution permitted extremely easy injection. The lens so obtained was colorless and transparent, and had a refractive index of 1.535, an Abbe number of 50 and a specific gravity of 1.17. Optical strain was not observed practically.

The example was also repeated with the internal mold releasing agent changed from "JP-506" to dibutyl phosphate, dioctyl phosphate and "Zelec UN", respectively. The results were similar, namely, good without any problem.

EXAMPLE 60

Mixed into a homogeneous solution were 18.5 parts (0.110 mole) of hexamethylene diisocyanate, 30.0 parts (1.14 mole) of hydrogenated MDi, 30.0 parts (0.326 mole) of glycerin, 0.02 wt. % of TBA, 0.01 wt. % of DBC and, as an internal mold releasing agent, 1.2 wt. % of "JP-506", followed by degasification at 20° C.

One hour later, the solution was injected into a mold for a concave lens having a central thickness of 1.5 mm. The mold was composed of two glass molds and a gasket. The viscosity of the solution immediately before the injection was 35 cps, namely, lower than 100 cps so that the injection was extremely easy. A similar test was also conducted separately at 20° C. As a result, its viscosity upon elapsed time of 5 hours was found to be 96 cps, namely, still lower than 100 cps and hence to be extremely low.

The mold was then gradually heated from 40° C. to 140° C., at which the solution was heated and cured for 5 hours. After cooling, the resulting lens was taken out of the mold and was heated again at 120° C. for 1 hour. The lens so obtained was inspected using a polarizing plate and a high pressure mercury vapor lamp. Optical strain was not observed practically. This result is also shown in Table 3.

The lens so obtained was colorless and transparent, and had a refractive index of 1.523 and an Abbe number of 51 as optical properties and a specific gravity of 1.20 as a physical property.

EXAMPLE 61

A test similar to that in Example 60 was conducted by changing the Lewis acid to 0.007 wt. % of DMC and 0.02 wt. % of TBA.

The result was good as in Example 60, as also shown in Table 3. Similarly to Example 60, the lens so obtained was colorless and transparent, and had a refractive index of 1.523 and an Abbe number of 50 as optical properties and a specific gravity of 1.24 as a physical property.

EXAMPLES 62–70 & COMPARATIVE EXAMPLES 10–12

To confirm advantageous effects of a catalyst making combined use of a tertiary amine and a Lewis acid, plastic lenses were produced in the same manner as in Example 60. The results are shown in Table 3. Those examples were repeated with the internal mold releasing agent changed to "Zelec UN", dibutyl phosphate and "JP-506", respectively. The results were similar, namely, good.

TABLE 3

| Example or Comp. Ex. | Tertiary amine (wt. %) | Lewis acid (wt. %) | Viscosity after 5 hrs (cps) | Optical strain |
|---|---|---|---|---|
| Comp. Ex. 10 | — | — | >1000 | C |
| Comp. Ex. 11 | TBA 0.02 | — | Immediately Resinified | C |
| Comp. Ex. 12 | — | DBC 0.01 | >1000 | C |
| Example 60 | TBA 0.02 | DBC 0.01 | <100 | A |
| Example 61 | TBA 0.02 | DMC 0.007 | <100 | A |
| Example 62 | Triethylamine 0.02 | DBC 0.01 | <100 | A |
| Example 63 | Dimethylcyclohexylamine 0.02 | DBC 0.01 | <100 | A |
| Example 64 | Diethylcyclohexylamine 0.02 | DBC 0.01 | <100 | A |
| Example 65 | Dimethylaniline 0.02 | DBC 0.01 | <100 | A |
| Example 66 | 2,2'-Dipyridyl 0.02 | DBC 0.01 | <100 | A |
| Example 67 | N-Methylpyrrole 0.01 | DBC 0.01 | <100 | A |
| Example 68 | Triethyldiamine 0.01 | DBC 0.01 | <100 | A |
| Example 69 | Tris(2,4,6-dimethylaminomethyl)phenol 0.01 | DBC 0.01 | <100 | A |
| Example 70 | Dibutylaminoethanol 0.01 | DBC 0.01 | <100 | A |

EXAMPLE 71

A test similar to that in Example 60 was conducted using 108.0 parts (0.574 mole) of XDi, 30.0 parts (0.326 mole) of glycerin, 40.0 parts (0.154 mole) of 1,2-bis(3-mercaptoethylthio)-3-mercaptopropane, 0.005 wt. % of DEC, 0.01 wt. % of DBC and, as an internal mold releasing agent, 1.0 wt. % of dibutyl phosphate. The result is shown in Table 4.

The lens so obtained was colorless and transparent, and had a refractive index of 1.593 and an Abbe number of 36 as optical properties and a specific gravity of 1.33 as a physical property.

EXAMPLES 72–106 & COMPARATIVE Examples 13–14

To confirm advantageous effects of a catalyst making combined use of a tertiary amine and a Lewis acid, plastic lenses were produced in the same manner as in Example 71. The results are shown in Table 4. Those examples were repeated with the internal mold releasing agent changed to "Zelec UN", dibutyl phosphate, dioctyl phosphate and "P-506", respectively. The results were similar, namely, good without any problem.

number of 36 and a specific gravity of 1.32. Optical strain was not observed practically.

The example was also repeated with the internal mold releasing agent changed from "JP-506" to "Zelec UN", dibutyl phosphate and dioctyl phosphate, respectively. The results were similar, namely, good without any problem.

EXAMPLE 108

A test similar to that in Example 60 was conducted using 84.5 parts (0.322 mole) of HMDi, 30.0 parts (0.141 mole) of GSA, 20.0 parts (0.110 mole) of 3,6-dioxaoctane-1,8-dimercaptan, 0.005 wt. % of DEC and 0.005 wt. % of DBC. As a result, the viscosity of the solution immediately before

TABLE 4

| Example or Comp. Ex. | Tertiary amine (wt. %) | Lewis acid (wt. %) | Viscosity after 5 hrs (cps) | Optical strain |
|---|---|---|---|---|
| Comp. Ex. 13 | DEC 0.005 | — | 400 | C |
| Comp. Ex. 14 | — | DBC 0.01 | 150 | C |
| Example 71 | DEC 0.005 | DBC 0.01 | <100 | A |
| Example 72 | DEC 0.003 | Alumina 0.003 | <100 | A |
| Example 73 | DEC 0.003 | Zinc chloride 0.005 | <100 | A |
| Example 74 | DEC 0.001 | Iron chloride 0.002 | <100 | A |
| Example 75 | DEC 0.05 | Zinc chloride 0.05 | <100 | B |
| Example 76 | DEC 0.005 | DMC 0.007 | <100 | A |
| Example 77 | TBA 0.005 | DMC 0.007 | <100 | A |
| Example 78 | TBA 0.005 | DBC 0.01 | <100 | A |
| Example 79 | Dimethylcyclo-hexylamine 0.005 | DBC 0.01 | <100 | A |
| Example 80 | Pyridine 0.02 | DBC 0.01 | <100 | A |
| Example 81 | 2,2'-Bipyridyl | DBC 0.01 | <100 | A |
| Example 82 | Dimethylaniline 0.01 | DBC 0.01 | <100 | A |
| Example 83 | N-Ethylcarbazole 0.005 | DBC 0.01 | <100 | A |
| Example 84 | Triethylamine 0.005 | DBC 0.01 | <100 | A |
| Example 85 | 1-Methylimidazole 0.005 | DBC 0.01 | <100 | A |
| Example 86 | N-Ethylpyrroline 0.005 | DBC 0.01 | <100 | A |
| Example 87 | N-Methylpyrroline 0.005 | DBC 0.01 | <100 | A |
| Example 88 | N-Methylpyrazole 0.005 | DBC 0.01 | <100 | A |
| Example 89 | Pyridazine 0.005 | DBC 0.01 | <100 | A |
| Example 90 | Pyrimidine 0.005 | DBC 0.01 | <100 | A |
| Example 91 | Pyrinoline 0.005 | DBC 0.01 | <100 | A |
| Example 92 | Oxazole 0.005 | DBC 0.01 | <100 | A |
| Example 93 | Thiazole 0.005 | DBC 0.01 | <100 | A |
| Example 94 | Purine 0.005 | DBC 0.01 | <100 | A |
| Example 95 | Quinoline 0.005 | DBC 0.01 | <100 | A |
| Example 96 | Isoquinoline 0.005 | DBC 0.01 | <100 | A |
| Example 97 | N,N-dimethylbenzyl-amine 0.008 | DBC 0.01 | <100 | A |
| Example 98 | N-Ethylpiperidine 0.005 | DBC 0.01 | <100 | A |
| Example 99 | N-Methylpiperazine 0.005 | DBC 0.01 | <100 | A |
| Example 100 | Dimethylamino-ethylacetate 0.005 | DBC 0.01 | <100 | A |
| Example 101 | N-Methylmorpholine 0.005 | DBC 0.01 | <100 | A |
| Example 102 | N-Methylpiperidone 0.005 | DBC 0.01 | <100 | A |
| Example 103 | N-Methylpyrrolidine 0.005 | DBC 0.01 | <100 | A |
| Example 104 | Triethylenediamine 0.002 | DBC 0.01 | <100 | A |
| Example 105 | Pentamethyldiethylene-triamine 0.003 | DBC 0.01 | <100 | A |
| Example 106 | 2,4,6-Tris(dimethylamino-methylphenol) 0.002 | DBC 0.01 | <100 | A |

EXAMPLE 107

A test similar to that in Example 60 was conducted using 53.0 parts (0.282 mole) of XDi, 48.0 parts (0.184 mole) of 1,3-bis(2-hydroxyethylthio)-2-propanol (hereinafter abbreviated as "GSA"), 0.005 wt. % of DEC, 0.005 wt. % of DBC and 1.0 wt. % of "JP-506". As a result, the viscosity of the solution immediately before fore injection was lower than 100 cps so that the solution permitted extremely easy injection. The lens so obtained was colorless and transparent, and had a refractive index of 1,592, an Abbe injection was lower than 100 cps so that the solution permitted extremely easy injection. The lens so obtained was colorless and transparent, and had a refractive index of 1.560, an Abbe number of 45 and a specific gravity of 1.19. Optical strain was not observed practically.

EXAMPLE 109

Mixed into a homogeneous solution were 13.5 parts (0.070 mole) of 1,4-diisothiocyanatobenzene, 7.7 parts (0.07 mole) of hydroquinone, 0.02 wt. % of TBA, 0.01 wt. % of DBC and, as an internal mold releasing agent, 1.2 wt. % of "JP-506", followed by degasification at 20° C.

One hour later, the solution was injected into a mold for a concave lens having a central thickness of 1.5 mm. The mold was composed of two glass molds and a gasket. The viscosity of the solution immediately before the injection was 35 cps, namely, lower than 100 cps so that the injection was extremely easy. A similar test was also conducted separately at 20° C. As a result, its viscosity upon elapsed time of 5 hours was found to be 75 cps, namely, still lower than 100 cps and hence to be extremely low.

The mold was then gradually heated from 40° C. to 140° C., at which the solution was heated and cured for 5 hours. After cooling, the resulting lens was taken out of the mold and was heated again at 120° C. for 1 hour. The lens so obtained was inspected using a polarizing plate and a high pressure mercury vapor lamp. Optical strain was not observed practically.

The lens so obtained was colorless and transparent, and had a refractive index of 1.78.

EXAMPLE 110

Mixed into a homogeneous solution were 10 parts (0.05 mole) of hexamethylene diisothiocyanate, 11 parts (0.025 mole) of tetrakis(mercaptoethylthiomethyl)methane, 0.02 wt. % of TBA, 0.01 wt. % of DBC and, as an internal mold releasing agent, 1.2 wt. % of "JP-506", followed by degasification at 20° C. One hour later, the solution was injected into a mold for a concave lens having a central thickness of 1.5 mm. The mold was composed of two glass molds and a gasket. The viscosity of the solution immediately before the injection was 35 cps, namely, lower than 100 cps so that the injection was extremely easy. A similar test was also conducted separately at 20° C. As a result, its viscosity upon elapsed time of 5 hours was found to be 60 cps, namely, still lower than 100 cps and hence to be extremely low.

The mold was then gradually heated from 40° C. to 140° C., at which the solution was heated and cured for 5 hours. After cooling, the resulting lens was taken out of the mold and was heated again at 120° C. for 1 hour. The lens so obtained was inspected using a polarizing plate and a high pressure mercury vapor lamp. Optical strain was not observed practically.

The lens so obtained was colorless and transparent, and had a refractive index of 1.70.

EXAMPLE 111

Mixed into a homogeneous solution were 16.3 parts (0.08 mole) of diisothiocyanatoethyl sulfide, 17.0 parts of hydroxyethylthiomethyl-tris(mercaptoethylthiomethyl) methane, 0.02 wt. % of TBA, 0.01 wt. % of DBC and, as an internal mold releasing agent, 1.2 wt. % of "JP-506", followed by degasification at 20° C. One hour later, the solution was injected into a mold for a concave lens having a central thickness of 1.5 mm. The mold was composed of two glass molds and a gasket. The viscosity of the solution immediately before the injection was 35 cps, namely, lower than 100 cps so that the injection was extremely easy. A similar test was also conducted separately at 20° C. As a result, its viscosity upon elapsed time of 5 hours was found to be 75 cps, namely, still lower than 100 cps and hence to be extremely low.

The mold was then gradually heated from 40° C. to 140° C., at which the solution was heated and cured for 5 hours. After cooling, the resulting lens was taken out of the mold and was heated again at 120° C. for 1 hour. The lens so obtained was inspected using a polarizing plate and a high pressure mercury vapor lamp. Optical strain was not observed practically.

The lens so obtained was colorless and transparent, and had a refractive index of 1.71.

EXAMPLE 112

Mixed into a homogeneous solution were 10.6 parts (0.06 mole) of 1-isocyanato-4-isothiocyanatobenzene, 6.6 parts (0.06 mole) of hydroquinone, 0.02 wt. % of TBA, 0.01 wt. % of DBC and, as an internal mold releasing agent, 1.2 wt. % of "JP-506", followed by degasification at 20° C. One hour later, the solution was injected into a mold for a concave lens having a central thickness of 1.5 mm. The mold was composed of two glass molds and a gasket. The viscosity of the solution immediately before the injection was 45 cps, namely, lower than 100 cps so that the injection was extremely easy. A similar test was also conducted separately at 20° C. As a result, its viscosity upon elapsed time of 5 hours was found to be 75 cps, namely, still lower than 100 cps and hence to be extremely low.

The mold was then gradually heated from 40° C. to 140° C., at which the solution was heated and cured for 5 hours. After cooling, the resulting lens was taken out of the mold and was heated again at 120° C. for 1 hour. The lens so obtained was inspected using a polarizing plate and a high pressure mercury vapor lamp. Optical strain was not observed practically.

The lens so obtained was colorless and transpar- ent, and had a refractive index of 1.70.

EXAMPLe 113

Mixed into a homogeneous solution were 8.5 parts (0.06 mole) of 1-isocyanato-3-isothiocyanatopropane, 7.0 parts (0.04 mole) of benzenetrithiol, 0.02 wt. % of TBA, 0.01 wt. % of DBC and, as an internal mold releasing agent, 1.2 wt. % of "JP-506", followed by degasification at 20° C. One hour later, the solution was injected into a mold for a concave lens having a central thickness of 1.5 mm. The mold was composed of two glass molds and a gasket. The viscosity of the solution immediately before the injection was 45 cps, namely, lower than 100 cps so that the injection was extremely easy. A similar test was also conducted separately at 20° C. As a result, its viscosity upon elapsed time of 5 hours was found to be 75 cps, namely, still lower than 100 cps and hence to be extremely low.

The mold was then gradually heated from 40° C. to 140° C., at which the solution was heated and cured for 5 hours. After cooling, the resulting lens was taken out of the mold and was heated again at 120° C for 1 hour. The lens so obtained was inspected using a polarizing plate and a high pressure mercury vapor lamp. Optical strain was not observed practically.

The lens so obtained was colorless and transparent, and had a refractive index of 1.75.

EXAMPLE 114

Mixed into a homogeneous solution were 17.0 parts (0.06 mole) of 4-isocyanato-4'-isothiocyanatodiphenyl sulfide, 7.6 parts (0.06 mole) of 4-mercaptophenol, 0.02 wt. % of TBA, 0.01 wt. % of DBC and, as an internal mold releasing agent, 1.2 wt. % of "JP-506", followed by degasification at 20° C. One hour later, the solution was injected into a mold for a concave lens having a central thickness of 1.5 mm. The mold was composed of two glass molds and a gasket. The viscosity of the solution immediately before the injection was 45 cps, namely, lower than 100 cps so that the injection was extremely easy. A similar test was also conducted separately at 20° C. As a result, its viscosity upon elapsed time of 5 hours was found to be 75 cps, namely, still lower than 100 cps and hence to be extremely low.

The mold was then gradually heated from 40° C. to 140° C., at which the solution was heated and cured for 5 hours. After cooling, the resulting lens was taken out of the mold and was heated again at 120° C. for 1 hour. The lens so obtained was inspected using a polarizing plate and a high pressure mercury vapor lamp. Optical strain was not observed practically.

The lens so obtained was colorless and transparent, and had a refractive index of 1.74.

EXAMPLE 115

Mixed into a homogeneous solution were 43.5 parts (0.23 mole) of m-xylylene diisocyanate, 56.5 parts (0.115 mole) of pentaerythritol tetrakis(3-mercaptopropionate), 0.005 wt. % of N,N-diethylcyclohexylamine, 0.01 wt. % of DBC and, as an internal mold releasing agent, 0.1 wt. % of "Zelec UN", followed by degasification at 20° C.

One hour later, the solution was injected into a mold for a concave lens having a central thickness of 1.5 mm. The mold was composed of two glass molds and a gasket. The mold was then heated for 2 hours in water of 40° C. and for additional 1 hour in water of 60° C. The mold was thereafter placed in an oven, where it was heated at 100° C. for 30 minutes and then at 140° C. for 1 hour so that the solution was cured under heat.

After cooling, the resulting lens was taken out of the mold and was heated again at 120° C. for 1 hour. The lens so obtained was inspected using a polarizing plate and a high pressure mercury vapor lamp. Optical strain was not observed practically.

EXAMPLE 116

Mixed into a homogeneous solution were 43.5 parts (0.23 mole) of m-xylylene diisocyanate, 56.5 parts (0.115 mole) of pentaerythritol tetrakis(3-mercaptopropionate), 0.005 wt. % of N,N-diethylcyclohexylamine and 0.01 wt. % of DBC, followed by degasification at 20° C.

One hour later, the solution was injected into a mold for a concave lens having a central thickness of 1.5 mm. The mold was composed of two glass molds on which a baking internal mold releasing agent ("YSR-6209", trade name; product of Toshiba Silicone Co., Ltd.) had been baked and a gasket. The mold was then heated for 2 hours in water of 40° C. and for additional 1 hour in water of 60° C. The mold was thereafter placed in an oven, where it was heated at 100° C. for 30 minutes and then at 140° C. for 1 hour so that the solution was cured under heat.

After cooling, the resulting lens was taken out of the mold and was heated again at 120° C. for 1 hour. The lens so obtained was inspected using a polarizing plate and a high pressure mercury vapor lamp. Optical strain was not observed practically.

What is claimed is:

1. A composition for a urethane-based plastic lens, comprising:
   (a) at least one compound selected from the group consisting of isocyanate compounds, isothiocyanate compounds and isocyanato-containing isothiocyanate compounds;
   (b) at least one active hydrogen compound selected from the group consisting of hydroxyl compounds, mercapto compounds and mercapto-containing hydroxyl compounds;
   (c) a tertiary amine having no electron attractive group; and
   (d) a Lewis acid which is capable of forming a complex or salt with the tertiary amine with the proviso that the Lewis acid is not dibutyltin dilaurate, dibutyltin diacetate or stannous octoate.

2. A composition according to claim 1, wherein the Lewis acid is a metal halide compound.

3. A composition according to claim 1, wherein the Lewis acid is an organometal halide compound.

4. A composition according to claim 3, wherein the organometal halide compound is an organotin halide compound.

5. A composition according to claim 1, further comprising an acidic phosphate ester or an acidic phosphonate ester as an internal mold releasing agent.

6. A composition according to claim 5, wherein the acidic phosphate ester is a mixture of an alkoxyalkyl diester and monoester of phosphoric acid.

7. A process for the production of an urethane-based plastic lens, which comprises heating and curing a composition according to claim 1.

8. A process according to claim 7, wherein a part of the heating is conducted in water.

9. A process for the production of an urethane-based plastic lens, which comprises heating and curing a composition according to claim 2.

10. A process according to claim 9, wherein a part of the heating is conducted in water.

11. A process for the production of an urethane-based plastic lens, which comprises heating and curing a composition according to claim 3.

12. A process according to claim 11, wherein a part of the heating is conducted in water.

13. A process for the production of an urethane-based plastic lens, which comprises heating and curing a composition according to claim 4.

14. A process according to claim 13, wherein a part of the heating is conducted in water.

15. A process for the production of an urethane-based plastic lens, which comprises heating and curing a composition according to claim 5.

16. A process according to claim 15, wherein a part of the heating is conducted in water.

17. A process for the production of an urethane-based plastic lens, which comprises heating and curing a composition according to claim 6.

18. A process according to claim 17, wherein a part of the heating is conducted in water.

* * * * *